(12) United States Patent
Shimizu et al.

(10) Patent No.: US 11,021,116 B2
(45) Date of Patent: Jun. 1, 2021

(54) CABLE HARNESS

(71) Applicant: Sumitomo Wiring Systems, Ltd., Mie (JP)

(72) Inventors: Moriyuki Shimizu, Mie (JP); Gen Nishino, Mie (JP); Toshinari Kobayashi, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/033,091

(22) Filed: Sep. 25, 2020

(65) Prior Publication Data
US 2021/0009052 A1  Jan. 14, 2021

Related U.S. Application Data

(62) Division of application No. 16/531,277, filed on Aug. 5, 2019, now Pat. No. 10,821,919, which is a division
(Continued)

(30) Foreign Application Priority Data

Oct. 31, 2014 (JP) .................................. 2014-223663

(51) Int. Cl.
*B60R 16/023* (2006.01)
*H01B 7/18* (2006.01)
(Continued)

(52) U.S. Cl.
CPC ........ *B60R 16/0215* (2013.01); *B60R 16/023* (2013.01); *H01B 7/0045* (2013.01);
(Continued)

(58) Field of Classification Search
CPC .............. B60R 16/0215; B60R 16/023; H01B 7/0045; H01B 7/18; H01B 7/282; H02G 3/0406; H02G 3/0462; Y02A 30/14
(Continued)

(56) References Cited

U.S. PATENT DOCUMENTS 4,428,613 A * 1/1984 Nomura ................ B60T 11/046
296/208
5,168,124 A * 12/1992 Takase ..................... H01R 4/70
174/23 R
(Continued)

FOREIGN PATENT DOCUMENTS

| | | |
|---|---|---|
| JP | 2004014475 | 1/2004 |
| JP | 2012130185 A | 7/2012 |
| JP | 2013237428 | 11/2013 |
| WO | 2014103499 A1 | 7/2014 |

OTHER PUBLICATIONS

Search Report for International Application No. PCT/JP2015/079799, dated Dec. 8, 2015, 4 pgs.

*Primary Examiner* — Timothy J Thompson
*Assistant Examiner* — Michael F McAllister
(74) *Attorney, Agent, or Firm* — Honigman LLP

(57) ABSTRACT

A cable harness that has water-sealing properties includes a sheath that accommodates an ABS sensor cable and a parking brake cable. The ABS sensor cable and the parking brake cable branch apart at an end portion of the sheath. An integrally molded member includes, in an integrated manner, a water-sealing portion that seals the end portion of the sheath from water, and a bracket attachment portion that is attached to the bracket.

20 Claims, 2 Drawing Sheets

Related U.S. Application Data of application No. 15/521,547, filed as application No. PCT/JP2015/079799 on Oct. 22, 2015, now Pat. No. 10,399,515.

(51) Int. Cl.
*H01B 7/282* (2006.01)
*B60T 7/10* (2006.01)
*B60R 16/02* (2006.01)
*H02G 3/04* (2006.01)
*H01B 7/00* (2006.01)
*B60T 7/08* (2006.01)

(52) U.S. Cl.
CPC ............... *H01B 7/18* (2013.01); *H01B 7/282* (2013.01); *H02G 3/0406* (2013.01); *H02G 3/0462* (2013.01); *B60T 7/085* (2013.01); *B60T 7/10* (2013.01); *Y02A 30/14* (2018.01)

(58) Field of Classification Search
USPC ....................................................... 174/72 A
See application file for complete search history.

(56) References Cited

U.S. PATENT DOCUMENTS

| | | | | |
|---|---|---|---|---|
| 6,069,319 | A * | 5/2000 | Davis, Jr. | B29C 44/12 |
| | | | | 174/110 F |
| 8,800,940 | B2 * | 8/2014 | Eshima | H02G 3/32 |
| | | | | 248/74.3 |
| 8,829,350 | B2 * | 9/2014 | Iwasaki | H01B 7/292 |
| | | | | 174/110 R |
| 9,742,103 | B2 * | 8/2017 | Yamamoto | H01R 13/5227 |
| 2008/0105454 | A1 * | 5/2008 | Morioka | H01B 3/441 |
| | | | | 174/120 SR |
| 2010/0147584 | A1 * | 6/2010 | Suzuki | H02G 3/0437 |
| | | | | 174/72 C |
| 2012/0223827 | A1 * | 9/2012 | Fazzalari | B60T 7/16 |
| | | | | 340/438 |
| 2012/0292101 | A1 | 11/2012 | Kato | |
| 2015/0008032 | A1 * | 1/2015 | Nakai | H02G 3/0691 |
| | | | | 174/650 |
| 2015/0355213 | A1 | 12/2015 | Kobayashi et al. | |
| 2016/0248235 | A1 * | 8/2016 | Itou | H02G 3/0468 |
| 2016/0339854 | A1 | 11/2016 | Hayakawa et al. | |
| 2017/0117070 | A1 * | 4/2017 | Komori | H01B 7/282 |

* cited by examiner

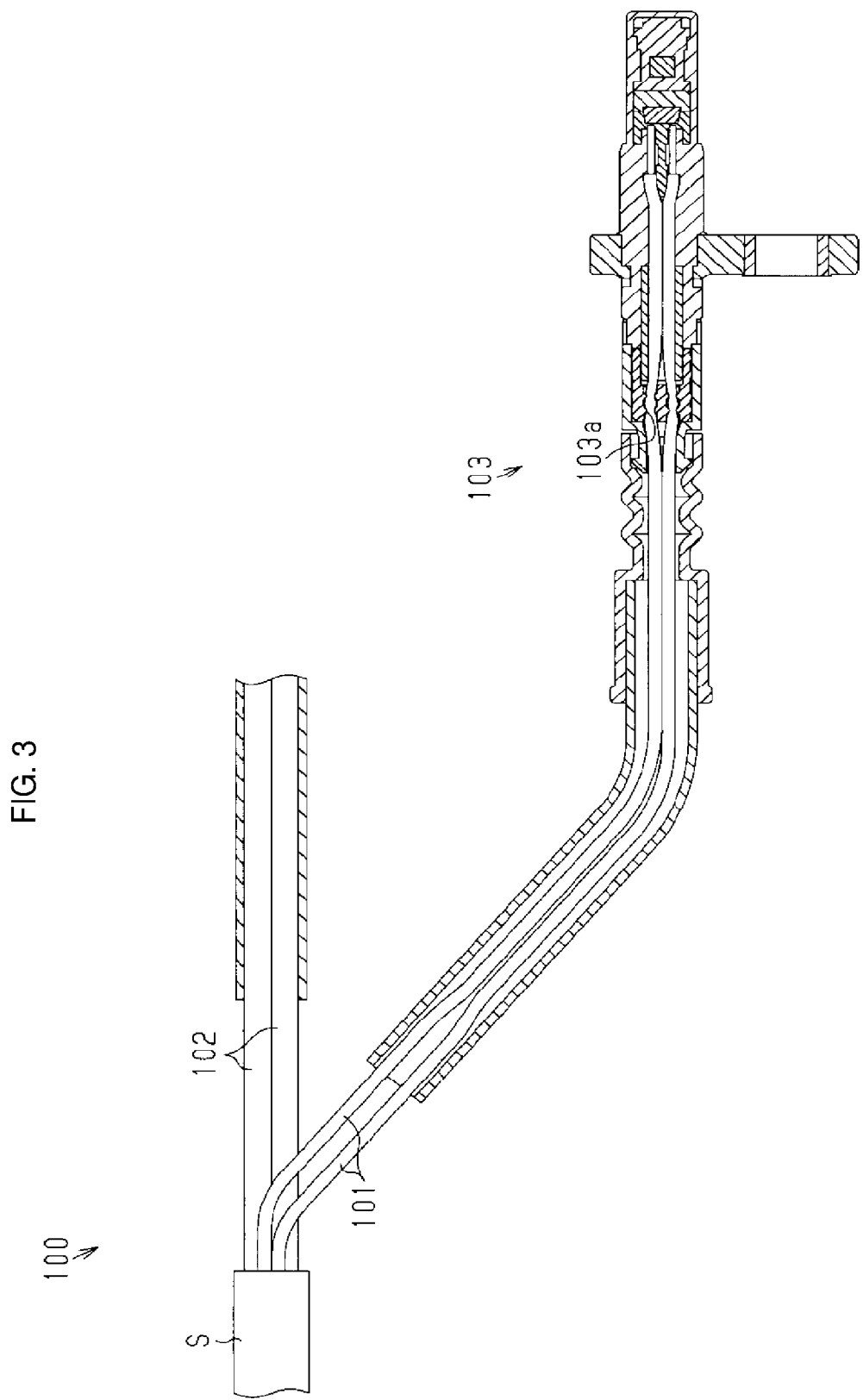

CABLE HARNESS

CROSS-REFERENCE TO RELATED APPLICATIONS

This application is a divisional of U.S. patent application Ser. No. 16/531,277 filed Aug. 5, 2019, which is a divisional of U.S. patent application Ser. No. 15/521,547 filed Apr. 24, 2017 which issued as U.S. Pat. No. 10,399,515 Sep. 3, 2019, which is a U.S. national stage of PCT/JP2015/079799 filed Oct. 22, 2015, which claims priority of Japanese Patent Application No. JP 2014-223663 filed Oct. 31, 2014.

TECHNICAL FIELD

The present disclosure relates to a cable harness.

BACKGROUND

Electric parking brake (EPB) mechanisms and antilock brake systems (ABS) are mounted in vehicles such as automobiles A cable harness 100, as shown in FIG. 3, that includes a single sheath S that covers an EPB system cable 102 and an ABS sensor cable 101 has been developed because the ABS sensor and the EPB mechanism are attached at positions that are close to each other. There are cases where various cables are connected in various types of systems including that described above (e.g. see JP 2013-237428A).

The cables 101 and 102 are to be connected to an ABS sensor 103 and the EPB mechanism respectively, and thus the cables 101 and 102 need to be branched at a mid-point in the cable harness 100. At this time, the sheath S of the cable harness 100 is partially stripped, and thus the cables 101 and 102 are exposed. At this time, there is a concern of water infiltrating into the sheath S. Note that, in FIG. 3, press fitting the cable 101 to a sensor head portion of the ABS sensor 103 provides a water-sealing portion 103a that acts as a water-sealing structure that seals the ABS sensor 103 from water.

There are cases where a bracket for fixedly connecting a cable harness to a mount portion in a vehicle or the like is used.

SUMMARY

The object of the present disclosure is to provide a cable harness with which the infiltration of water into the sheath can be suppressed while an increase in the number of parts can be suppressed.

An aspect of the present disclosure is a cable harness that is provided with a sheath that accommodates at least an ABS sensor electrical line and a parking brake electrical line, the cable harness includes: an integrally molded member that includes a water-sealing portion that seals an end portion of the sheath where the ABS sensor electrical line and the parking brake electrical line branch apart, from water; and a bracket attachment portion to which a bracket is attached.

With this configuration, because the end portion of the sheath is sealed from water by the water-sealing portion, and the water-sealing portion and the bracket attachment portion are molded in one piece, an increase in the number of parts can be suppressed. Other facets and advantages of the present disclosure will be made clear from the drawings showing examples of technical concepts of the present disclosure and that disclosed below.

BRIEF DESCRIPTION OF DRAWINGS

FIG. 3 is a cross-sectional diagram of a cable harness according to a reference example.

DETAILED DESCRIPTION OF THE PREFERRED EMBODIMENTS

An embodiment of a cable harness will be described below.

Figure 1:
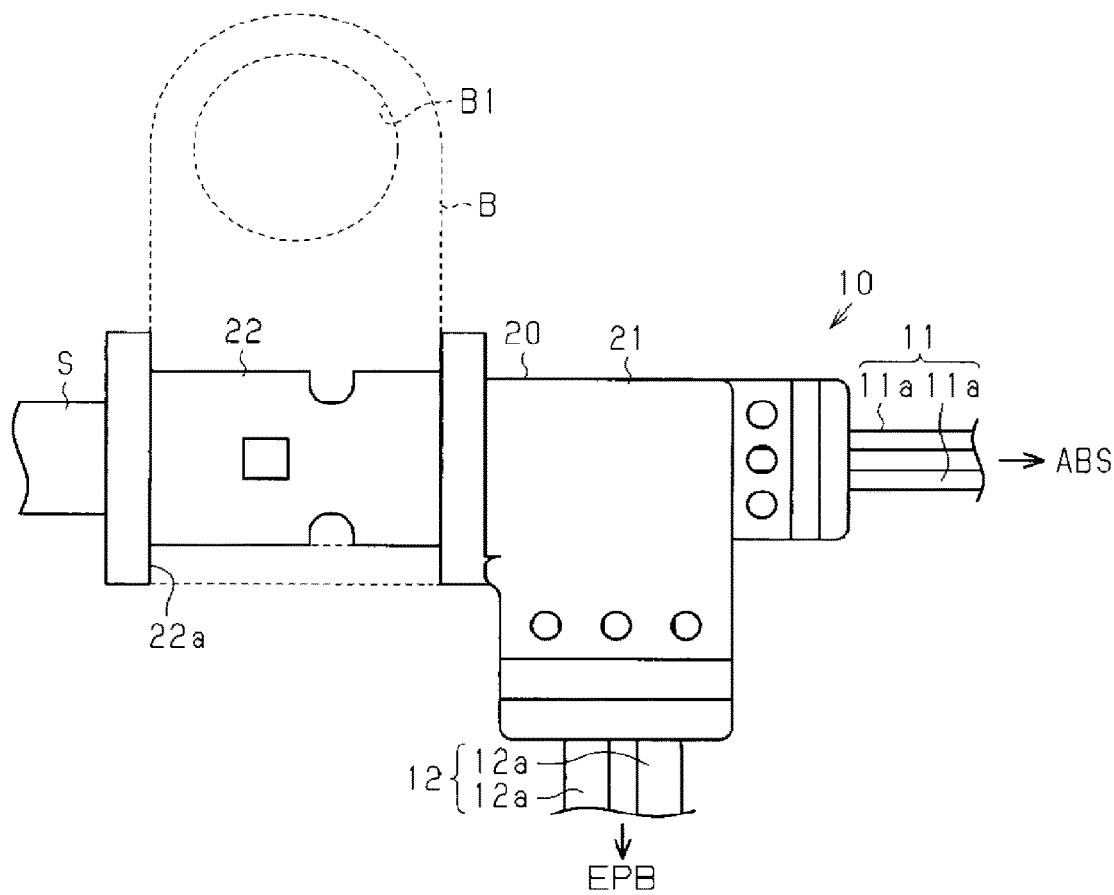
FIG. 1 is a schematic view of a cable harness according to an embodiment.

As shown in FIG. 1, a cable harness 10 of the present embodiment is formed by an ABS sensor cable 11 and a parking brake cable 12 being jointly covered by a sheath S and integrated with each other.

Figure 2:
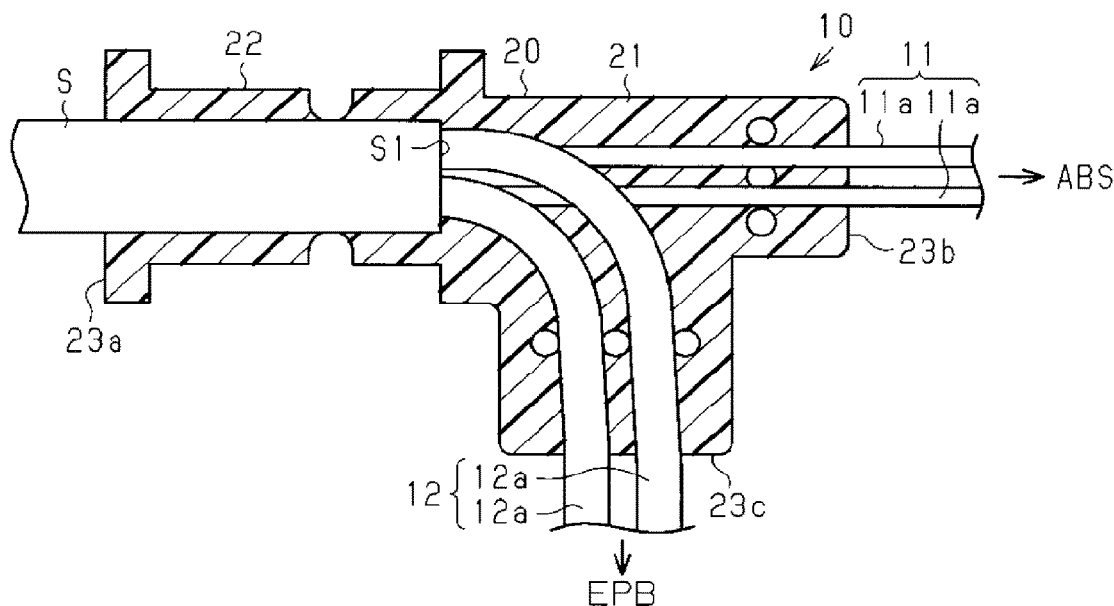
FIG. 2 is a partial cross-sectional diagram for illustrating a water-sealing structure of the cable harness shown in FIG. 1.

As shown in FIG. 2, the ABS sensor cable 11 and the parking brake cable 12 branch apart at an end portion S1 of the sheath S.

As shown in FIG. 1 and FIG. 2, the ABS sensor cable 11 is formed by two signal lines 11a. Each of the signal lines 11a are conductors sheathed in an insulating body. The ABS sensor cable 11 is attached to an ABS sensor at an end thereof.

The parking brake cable 12 is used as an electrical conduction path through which a current flows, which mainly results from a pressing operation being performed on a predetermined button after a vehicle has been parked, the current causing a mechanism (electronic parking brake (EPB)) that is for suppressing rotation of vehicle wheels, to function. The parking brake cable 12 is for electrically connecting an EPB control unit (omitted from the drawings) and an EPB mechanism. For this reason, the parking brake cable 12 has two power-source lines 12a. Also, examples of the EPB mechanism include types where wires in a conventional parking brake mechanism are pulled by an actuator, and types where a dedicated electronic actuator is mounted to a hydraulic brake caliper.

As described above, the sheath S of the cable harness 10 of the present embodiment is configured by a so-called four-core electrical line, with the two signal lines 11a constituting the ABS sensor cable 11 and the two power-source lines 12a constituting the parking break cable 12 being accommodated therein.

Also, the cable harness 10 of the present embodiment is provided with a molded portion 20, which is a urethane resin member, at the end portion S1 of the sheath S. The molded portion 20 is a member in which a water-sealing portion 21 and a bracket attachment portion 22 are molded in one piece using urethane molding.

The water-sealing portion 21 is formed to cover the region where the end portion S1 of the sheath S, the ABS sensor cable 11, and the parking brake cable 12 branch apart. The ABS sensor cable 11 is drawn out along the longitudinal direction of the sheath S, and the parking brake cable 12 is drawn out so as to be orthogonal to the longitudinal direction of the sheath S and is covered by the water-sealing portion 21.

The bracket attachment portion 22 is molded in one piece with the water-sealing portion 21, on a base end side relative to the end portion S1 of the sheath S, i.e. on a side opposite the region where the ABS sensor cable 11 and the parking brake cable 12 branch apart. The bracket attachment portion 22 has an approximately columnar shape, and a bracket B is crimped and fixed to the bracket attachment portion 22. Note that the bracket B can have a through-hole B1 for attachment. The bracket B and the cable harness 10 can be fixed to a vehicle by using the through-hole B1 and a fastening member such as a bolt.

Next, effects of the present embodiment will be described.

Signals detected by the ABS sensor are transmitted through the cable harness 10 of the present embodiment using the signal lines 11a of the ABS sensor cable 11. Furthermore, power is supplied to the EPB mechanism by the power-source lines 12a of the parking brake cable 12.

Here, the cable harness 10 can suppress the infiltration of water into the sheath S via the end portion S1 thereof because the water-sealing portion 21 covers the region where the end portion S1 of the sheath S, the ABS sensor cable 11, and the parking brake cable 12 branch apart. Also, because the water-sealing portion 21 is formed in one piece with the bracket attachment portion 22 for attaching the bracket B to an unshown vehicle, an increase in the number of parts is suppressed.

Next, the effects of the present embodiment will be described.

(1) Because the water-sealing portion 21 and the bracket attachment portion 22 are molded in one piece and the water-sealing portion 21 also seals the end portion S1 of the sheath S from water, an increase in the number of parts can be prevented.

(2) Compared with the case where a configuration is employed in which the bracket attachment portion and the water-sealing portion are separate members, there is no particular need to provide a gap between the bracket attachment portion 22 and the water sealing portion 21 as they are molded in one piece, and therefore the size of the sheath S of the molded portion 20 can be suppressed in the longitudinal direction thereof.

(3) The directions in which the cables 11 and 12 are drawn out can be fixed by the molded water-sealing portion 21. For example, the molded portion 20 can include a first terminal 23a that is terminated on the sheath S, a second terminal 23b that is terminated on the ABS sensor cable 11, and a third terminal 23c that is terminated on the parking brake cable 12. The second terminal 23b and the third terminal 23c can have different angles with respect to the longitudinal axis of the sheath S (e.g. 00 and 90).

(4) The molded portion 20 may be a part that is made of a synthetic resin and has no joints. With this configuration, the water-sealing properties of the molded portion 20 can be improved.

(5) The end portion S1 of the sheath S, a portion of the ABS sensor cable 11, and a portion of the parking brake cable 12 are embedded in the molded portion 20. With this configuration, the water-sealing properties of the molded portion 20 can be improved.

(6) It is preferable that the bracket attachment portion 22 covers the sheath S. With such a configuration, stress on the cables 11 and 12 exposed from the sheath S can be mitigated.

(7) It is preferable that the bracket attachment portion 22 includes at least one positioning stopper 22a. With this configuration, positional shifting of the bracket B can be mitigated.

Note that changes such as the following may be made to the above-described embodiment.

In the above-described embodiment, a configuration is employed where the bracket B is crimped and fixed to the bracket attachment portion 22, but there is no limit to this.

In the above-described embodiment, the cable harness 10 is configured by a so-called four-core electrical line, but there is no limit to this. For example, a configuration may be employed using a six-core electrical line that has six electrical lines (cables) in the sheath S of the cable harness 10. An example of a six-core electrical line includes an electrical line where two active suspension electrical lines are passed through the sheath S of the cable harness 10 in addition to the above-described four-core electrical line.

In the above-described embodiment, it is preferable that the material of the molded portion 20 that has the water-sealing portion 21 and the bracket attachment portion 22 is urethane resin, but a synthetic resin other than urethane resin can be used.

The above-described embodiment and variations thereof may be appropriately combined.

The present disclosure is not limited to that illustrated. For example, illustrated features are not to be interpreted as being essential to the present disclosure, and the subject matter of the present disclosure may exist with fewer features than all of those of the specified embodiment thus disclosed.

What is claimed is:

1. A cable harness for a vehicle, in which at least an ABS sensor cable and a parking brake cable are contained inside of a sheath, the cable harness comprising:
   a water-sealing portion configured to position the ABS sensor cable and the parking brake cable to branch apart in different directions in which the ABS sensor cable and the parking brake cable are drawn out at an end portion of the sheath, and that seals the end portion of the sheath from water,
   the ABS sensor cable is constituted by a plurality of signal lines,
   the parking brake cable is constituted by a plurality of power-source lines, and
   in an inner portion of the water-sealing portion, the water-sealing portion is configured to position the plurality of signal lines so as to be spaced apart from each other and position the plurality of power-source lines so as to be spaced apart from each other.

2. The cable harness according to claim 1, wherein the water-sealing portion is formed between the plurality of signal lines and is formed between the plurality of power-source lines.

3. The cable harness according to claim 1, wherein a bracket attachment portion for attaching a bracket is integrally provided on the water-sealing portion.

4. The cable harness according to claim 3, wherein the bracket attachment portion is provided on the sheath.

5. The cable harness according to claim 3, wherein the water-sealing portion and the bracket attachment portion are integrally formed of urethane.

6. The cable harness according to claim 1, wherein an electrical line separate from the ABS sensor cable and the parking brake cable is further contained inside of the sheath.

7. The cable harness according to claim 6, wherein the electrical line includes two electrical lines for active suspension.

8. The cable harness according to claim 1, wherein the ABS sensor cable and the parking brake cable are drawn out in a direction so as to intersect each other.

9. The cable harness according to claim 2, wherein a bracket attachment portion for attaching a bracket is integrally provided on the water-sealing portion.

10. The cable harness according to claim 4, wherein the water-sealing portion and the bracket attachment portion are integrally formed of urethane.

11. The cable harness according claim 2, wherein an electrical line separate from the ABS sensor cable and the parking brake cable is further contained inside of the sheath.

12. The cable harness according claim 3, wherein an electrical line separate from the ABS sensor cable and the parking brake cable is further contained inside of the sheath.

13. The cable harness according claim 4, wherein an electrical line separate from the ABS sensor cable and the parking brake cable is further contained inside of the sheath.

14. The cable harness according claim 5, wherein an electrical line separate from the ABS sensor cable and the parking brake cable is further contained inside of the sheath.

15. The cable harness according to claim 2, wherein the different drawing-out directions are directions in which the ABS sensor cable and the parking brake cable intersect each other.

16. The cable harness according to claim 3, wherein the different drawing-out directions are directions in which the ABS sensor cable and the parking brake cable intersect each other.

17. The cable harness according to claim 4, wherein the different drawing-out directions are directions in which the ABS sensor cable and the parking brake cable intersect each other.

18. The cable harness according to claim 5, wherein the different drawing-out directions are directions in which the ABS sensor cable and the parking brake cable intersect each other.

19. The cable harness according to claim 6, wherein the different drawing-out directions are directions in which the ABS sensor cable and the parking brake cable intersect each other.

20. The cable harness according to claim 7, wherein the different drawing-out directions are directions in which the ABS sensor cable and the parking brake cable intersect each other.

* * * * *